US012152747B2

(12) United States Patent
Ye et al.

(10) Patent No.: US 12,152,747 B2
(45) Date of Patent: Nov. 26, 2024

(54) STRUCTURE OF A LAMP COMPRISING A LIGHT GUIDING ELEMENT WITH TWO SEQUENTIAL BODIES THAT GUIDE THE LIGHT FROM A LIGHT EMITTING ELEMENT

(71) Applicants: JIN HUI SILICONE RUBBER INDUSTRIAL CO., LTD., Tainan (TW); DrLightek Co., Ltd., Tainan (TW)

(72) Inventors: Zhi-Ting Ye, Miaoli County (TW); Chia-Chun Hu, Tainan (TW); Yang-Jun Zheng, Kaohsiung (TW); Chang-Che Chiu, Chiayi County (TW)

(73) Assignees: JIN HUI SILICONE RUBBER INDUSTRIAL CO., LTD., Tainan (TW); DRLIGHTEK CO., LTD., Tainan (TW)

( * ) Notice: Subject to any disclaimer, the term of this patent is extended or adjusted under 35 U.S.C. 154(b) by 0 days.

(21) Appl. No.: 18/606,143

(22) Filed: Mar. 15, 2024

(65) Prior Publication Data

US 2024/0353079 A1 Oct. 24, 2024

(30) Foreign Application Priority Data

Apr. 21, 2023 (TW) ................................ 112115055

(51) Int. Cl.

| | |
|---|---|
| ***F21S 41/24*** | (2018.01) |
| ***F21S 41/255*** | (2018.01) |
| ***F21S 41/29*** | (2018.01) |
| ***F21S 41/365*** | (2018.01) |
| ***F21S 41/47*** | (2018.01) |
| ***F21S 43/247*** | (2018.01) |

(Continued)

(52) U.S. Cl.
CPC ............ *F21S 41/24* (2018.01); *F21S 41/255* (2018.01); *F21S 41/29* (2018.01); *F21S 41/365* (2018.01); *F21S 41/47* (2018.01); *F21S 43/247* (2018.01); *F21S 43/27* (2018.01); *F21S 43/31* (2018.01); *F21V 5/002* (2013.01); *F21V 2200/20* (2015.01)

(58) Field of Classification Search
CPC ........ F21S 41/24; F21S 43/247; F21S 43/241; F21S 43/239; F21S 43/252; G02B 6/0045; G02B 6/0046
See application file for complete search history.

(56) References Cited

U.S. PATENT DOCUMENTS 10,288,248 B1 * 5/2019 Crespin ................ F21S 41/141

* cited by examiner

*Primary Examiner* — Robert J May
(74) *Attorney, Agent, or Firm* — WPAT, P.C

(57) ABSTRACT

The present invention provides a structure of car lamp comprising a light-guiding element and a light-emitting device. The width of a first body shrinks gradually from a first light-emergence plane to a first light-incidence plane and forming a first side oblique plane and a second side oblique plane. A second body of the light-guiding element includes a second light-incidence plane and a second light-emergence plane. The second light-incidence plane is connected to the first light-emergence plane. The first body includes side oblique planes and oblique planes; the second body includes a third side oblique plane, a reflective plane, and oblique planes. By using the side oblique planes, the reflective planes, and the oblique planes to reflect part of incident light out of the light-guiding element, the reduction of the overall luminous efficacy of the structure of car lamp can be avoided.

15 Claims, 17 Drawing Sheets

(51) Int. Cl.

| | |
|---|---|
| ***F21S 43/27*** | (2018.01) |
| ***F21S 43/31*** | (2018.01) |
| ***F21V 5/00*** | (2018.01) |

STRUCTURE OF A LAMP COMPRISING A LIGHT GUIDING ELEMENT WITH TWO SEQUENTIAL BODIES THAT GUIDE THE LIGHT FROM A LIGHT EMITTING ELEMENT

BACKGROUND OF THE INVENTION

The light-emitting diodes of the structure of car lamp according to the prior art usually use light-guiding elements to change the shape of the emergent light. Unfortunately, the range of changing the shape of light according to the prior art is limited, so a shielding member is disposed to directly block part of the emergent light for adjusting the shape of the emergent light. However, it also reduces the luminous efficacy of car lamps; it requires more power to meet the brightness requirements. Accordingly, the industry needs a structure of car lamp that can effectively adjust the shape of emergent light.

To solve the above problem according to the prior art, the present invention provides a structure of car lamp. It uses a light-guiding element to guide the light from a light-emitting device. The side surface of the light-guiding element is a side oblique plane. By using reflective planes, part of incident light is reflected to the light-emergence planes. With the capability of adjusting the shape of emergent light, the reduction of the overall luminous efficacy of the structure of car lamp can be avoided.

SUMMARY OF THE INVENTION

An objective of the present invention is to provide a structure of car lamp. A third side oblique plane, reflective planes, and oblique planes are disposed on the surfaces of a light-guiding element. By using the third side oblique plane and the reflective planes to reflect part of incident light to the light-emergence planes, the reduction of the overall luminous efficacy of the structure of car lamp can be avoided.

To achieve the above objective and efficacy, the present invention provides a structure of car lamp, which comprises a light-emitting device and a light-guiding element. The light-guiding element includes a first body and a second body. The first body includes a first light-incidence plane on the end corresponding to the light-emitting device and a first light-emergence plane on the other end thereof. The width of the first body shrinks gradually from the first light-emergence plane to the first light-incidence plane and forming a first side oblique plane and a second side oblique plane sequentially on both sides of the first body. The first body includes a first flat reflective plane at the bottom. The top of the first body slopes upward from the first light-incidence plane to the first light-emergence plane to form a first top oblique plane. The second body includes a second light-incidence plane on one end and a second light-emergence plane on the other end thereof. The second light-incidence plane is connected to the first light-emergence plane. The second body includes a third side oblique plane, respectively, on both sides between the second light-incidence plane and the second light-emergence plane. The second body includes a second flat reflective plane at the bottom. The top of the second body slopes upward from the second light-incidence plane to the second light-emergence plane to form a second top oblique plane. A first angle between the first side oblique plane and the first light-emergence plane is smaller than a second angle between the second side oblique plane and the first light-emergence plane. A third angle between the third oblique plane and the first light-emergence plane is greater than the second angle. The light-emitting device emits light to the light-guiding element. Part of the light passes through the first body and the second body of the light-guiding element sequentially. Then the light passes through the second light-emergence plane for emitting outward. After the other part of the light is emitted to the third side oblique plane, it is reflected and emitted outward from the second light-emergence plane. By adjusting the shape of emergent light using the structure, the reduction of the overall luminous efficacy of the structure of car lamp can be avoided.

To achieve the above objective and efficacy, the present invention provides a structure of car lamp, which comprises a light-emitting device and a light-guiding element. The light-guiding element includes a first body and a second body. The first body includes a first light-incidence plane one the end corresponding to the light-emitting device and a first light-emergence plane on the other end thereof. The width of the first body shrinks gradually from the first light-emergence plane to the first light-incidence plane and forming a first side oblique plane and a second side oblique plane sequentially on both sides of the first body. The bottom of the first body slopes downward from the first light-emergence plane to the first light-incidence plane to form a first bottom oblique plane. The bottom of the first body slopes downward from the first light-emergence plane to the first side oblique plane to form a second bottom oblique plane. The top of the first body slopes upward from the first light-incidence plane to the first light-emergence plane to form a first top oblique plane. The second body includes a second light-incidence plane on one end and a second light-emergence plane on the other end thereof. The second light-incidence plane is connected to the first light-emergence plane. The second body includes a third side oblique plane, respectively, on both sides between the second light-incidence plane and the second light-emergence plane. The bottom of the second body slopes downward from the second light-emergence plane to the second light-incidence plane to form a third bottom oblique plane. The bottom of the second body slopes downward from the second light-emergence plane to the second light-incidence plane to form a fourth bottom oblique plane. The third bottom oblique plane is connected to the second bottom oblique plane. The fourth bottom oblique plane is connected to the first bottom oblique plane. The top of the second body slopes upward from the second light-incidence plane to the second light-emergence plane to form a second top oblique plane. The light-emitting device emits light to the light-guiding element. Part of the light passes through the first body and the second body of the light-guiding element sequentially. Then the light passes through the second light-emergence plane for emitting outward. After the other part of the light is emitted to the third side oblique plane, it is reflected and emitted outward from the second light-emergence plane. By adjusting the shape of emergent light using the structure, the reduction of the overall luminous efficacy of the structure of car lamp can be avoided.

According to an embodiment of the present invention, the first angle is between 70° and 90°; the second angle is between 70° and 90°; and the third angle is between 80° and 95°. The first top oblique plane is connected to the second top oblique plane. A fourth angle between the first top oblique plane and the normal of the second light-emergence plane and between the second top oblique plane and the normal of the second light-emergence plane is between 0° and 5°.

According to an embodiment of the present invention, the structure of car lamp further comprises a light-incidence microstructure, a light-emergence microstructure, a clamping member, and an optical lens. The light-incidence microstructure is disposed on the first light-incidence plane. The light-emergence microstructure is disposed on the second light-emergence plane. The clamping member is disposed between the light-emitting device and the light-guiding element. The light-emitting device is disposed on one end of the clamping member. The first body is disposed on the other end of the clamping member. The optical lens is disposed on one side of the second light-emergence plane and receive the light from the second light-emergence plane.

According to an embodiment of the present invention, the light-emergence microstructure blocks a part of the second light-emergence plane.

According to an embodiment of the present invention, the optical lens includes a first convex surface on one side and a second convex surface on the other. The first convex surface of the optical lens receives the light emitted from the second light-emergence plane. In addition, the radius of the first convex surface is greater than the radius of the second convex surface.

According to an embodiment of the present invention, the optical lens includes a first flat surface on one side and a third convex surface on the other. The first flat surface of the optical lens receives the light emitted from the second light-emergence plane.

According to an embodiment of the present invention, the structure of car lamp further comprises a shielding assembly disposed between the second light-emergence plane and the optical lens. The shielding assembly includes a hole and a bottom shielding member. The light passes through the hole located on the top of the bottom shielding member. The bottom shielding member is used for blocking part of the scattered light. The shielding assembly further includes a top shielding member disposed on the top of the hole. The light passes through the hole.

According to an embodiment of the present invention, the first angle is between 70° and 90°; the second angle is between 70° and 90°; and the third angle is between 80° and 95°. The first top oblique plane is connected to the second top oblique plane. A fourth angle between the first top oblique plane and the normal of the second light-emergence plane and between the second top oblique plane and the normal of the second light-emergence plane is between 0° and 5°. A fifth angle of the first bottom oblique plane and the fourth bottom oblique plane is between 0° and 5°. A sixth angle of the second bottom oblique plane and the third bottom oblique plane is between 0° and 5°. The fifth angle is smaller than or equal to the sixth angle. A connecting plane is disposed among the first bottom oblique plane, the second bottom oblique plane, the third oblique plane, and the fourth bottom oblique plane. A seventh angle of the connecting plane is between 130° and 150°.

DETAILED DESCRIPTION OF THE INVENTION

In order to make the structure and characteristics as well as the effectiveness of the present invention to be further understood and recognized, the detailed description of the present invention is provided as follows along with embodiments and accompanying figures.

To solve the above problems according to the prior art, the present invention provides a structure of car lamp. The width of a first body of a light-guiding element shrinks gradually from a first light-emergence plane to a first light-incidence plane and forming a first side oblique plane and a second side oblique plane. A second body of the light-guiding element includes a second light-incidence plane and a second light-emergence plane. The second light-incidence plane is connected to the first light-emergence plane. The second body includes a third side oblique plane on both sides, respectively. A light-emitting device emit light, which passes through the first body and the second body sequentially. By using the third side oblique plane to reflect part of incident light out of the light-guiding element, the reduction of the overall luminous efficacy of the structure of car lamp can be avoided.

Figure 1A:
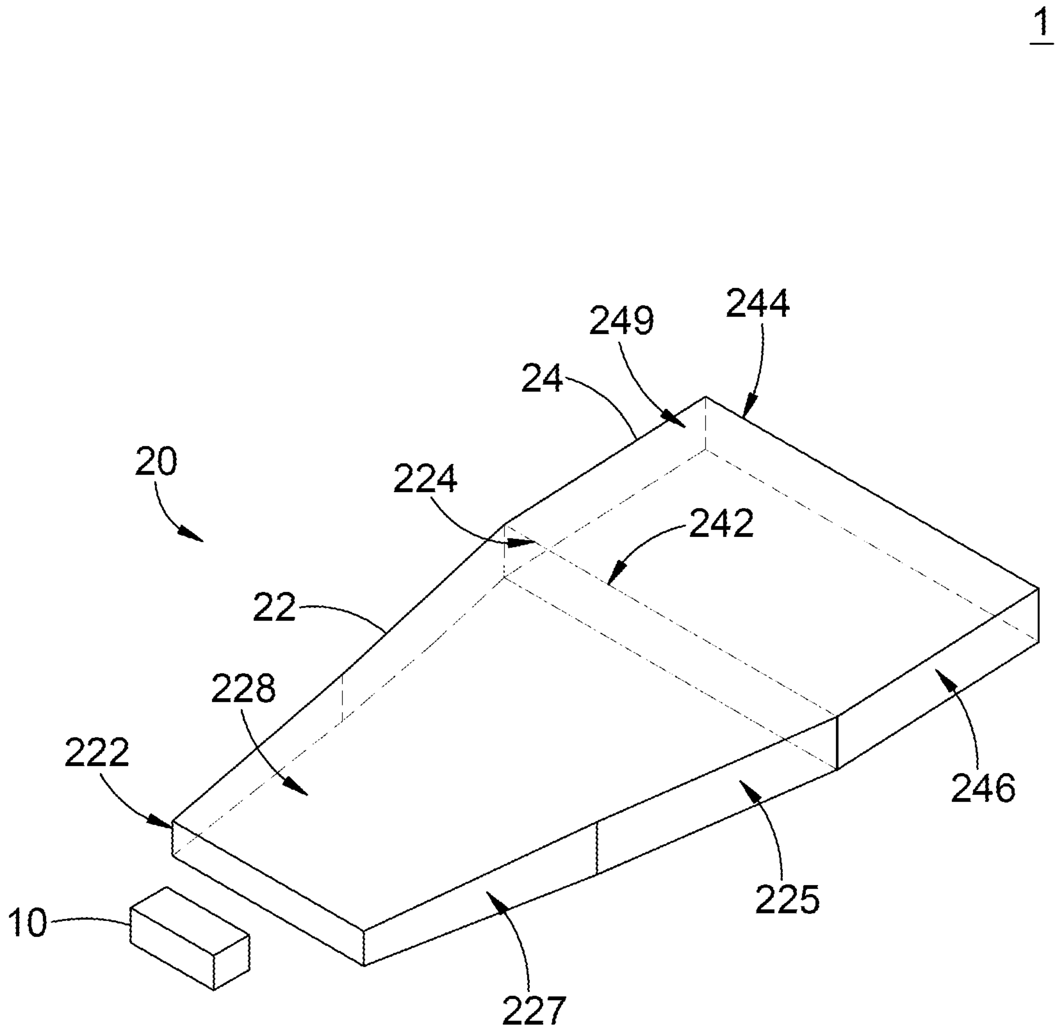
FIG. 1A shows a stereoscopic structural view according to an embodiment of the present invention.

Please refer to FIG. 1A, which shows a stereoscopic structural view according to an embodiment of the present invention. As shown in the figure, the present embodiment is the first embodiment. According to the present embodiment, a structure of car lamp 1 comprises a light-emitting device 10 and a light-guiding element 20. These components are disposed correspondingly.

According to the present embodiment, the light-emitting device 10 is a mini light-emitting diode (mini LED) formed by a semiconductor chip. A p-n structure will be formed by using processes such as injecting or doping a semiconductor material. Like other diodes, the current in an LED can flow easily from the p-region (the anode) to the n-region (the cathode) but not the other way around. Two different carriers, holes and electrons, flow from the electrode to the p-n structure under different voltages applied to the electrodes. When hole and electrons meet, they recombine and electrons will fall to lower energy levels. Meanwhile, the energy will be released in the form of photons. Micro LEDs are LEDs with the size below micrometers and capable of enhancing the brightness of the light-emitting device 10.

Figure 1B:
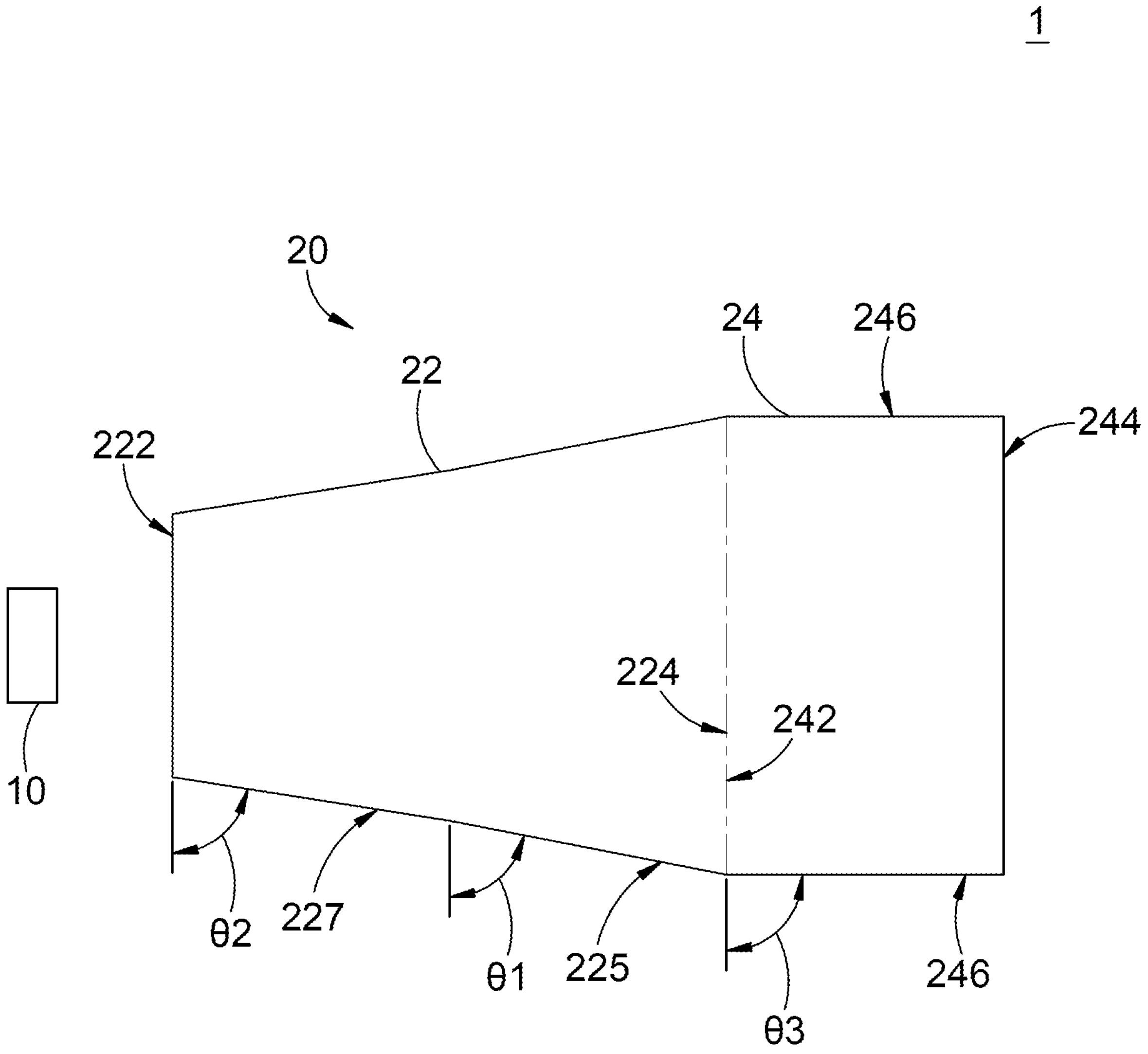
FIG. 1B shows a top view according to an embodiment of the present invention.
Figure 1C:
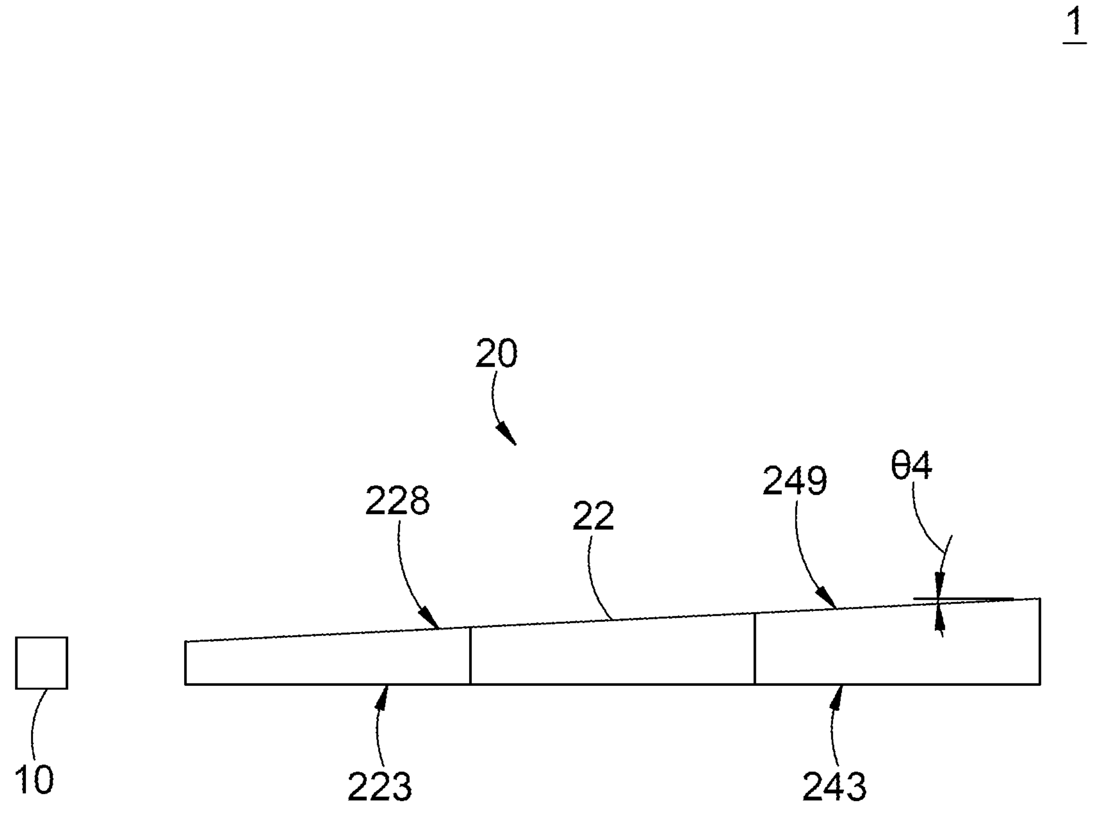
FIG. 1C shows a side view according to an embodiment of the present invention.

Please refer to FIG. 1A again and to FIG. 1B and FIG. 1C. FIG. 1B shows a top view according to an embodiment of the present invention; FIG. 1C shows a side view according to an embodiment of the present invention. As shown in the figures, according to the present embodiment, the light-guiding element 20 includes a first body 22 and a second body 24. The first body 22 includes a first light-incidence plane 22 on the end corresponding to the light-emitting device 10. The first body 22 includes a first light-emergence plane 224 on the other end. In addition, the width of the first body 22 shrinks gradually from the first light-emergence plane 224 to the first light-incidence plane 222. The second body 24 includes a second light-incidence plane 242 on one end and a second light-emergence plane 244 on the other end. The second light-incidence plane 242 is connected to the first light-emergence plane 224.

According to the present embodiment, the width of the first body 22 shrinks gradually from the first light-emergence plane 224 to the first light-incidence plane 222 and forming a first side oblique plane 225 and a second side oblique plane 227 on both sides. The first side oblique plane 225 is connected to the second side oblique plane 227. Besides, the second body 24 includes a third side oblique plane 246 on both sides between the second light-incidence plane 242 and the second light-emergence plane 244, respectively. The third side oblique plane 246 is used for reflecting part of the light emitted from the light-emitting device 10. According to the present embodiment, a first angle θ1 between the first side oblique plane 225 and the first light-emergence plane 224 is smaller than a second angle θ2 between the second side oblique plane 227 and the first light-emergence plane 224. A third angle θ3 between the third oblique plane 246 and the first light-emergence plane 224 is greater than the second angle θ2. The first side oblique plane 225, the second side oblique plane 227, and the third side oblique plane 246 can adjust the angles of the light incident to the first body correspondingly.

According to the present embodiment, the first angle is between 70° and 90°; the second angle is between 70° and 90°; and the third angle is between 80° and 95° (as shown in FIG. 1B). For example, when the first angle θ1 is 79°, since the second angle θ2 should be greater than the first angle θ1, the second angle θ2 can be 81°; and since the third angle θ3 should be greater than the second angle θ2, the third angle θ3 can be 90°. Nonetheless, the present embodiment is not limited to the embodiment.

According to the present embodiment, since the first top oblique plane 228 is connected to the second top oblique plane 249, a fourth angle θ4 between the first top oblique plane 228 and the normal of the second light-emergence plane 244 and between the second top oblique plane 249 and the normal of the second light-emergence plane 244 is between 0° and 5° (as shown in FIG. 1C. For example, the fourth angle θ4 is 3°.

According to the present embodiment, the first body 22 and the second body 24 are connected to form an integral structure. In other words, the first light-emergence plane 224 of the first body 22 overlaps with the second light-incidence plane 242 of the second light-incidence plane 242. Then the first body 22 and the second body 24 form an integral structure (as shown in FIG. 1B).

According to the present embodiment, the material of the light-guiding element 20 is liquid silicone rubber (LSR). Likewise, the material of the first body 22 and the second body 24 of the light-guiding element 20 is LSR.

Compared with solid high-temperature vulcanized silicone rubber, LSR is liquid rubber with good fluidity, fast vulcanization, safer and environmentally friendly, and can fully meet food-grade requirements. According to the position of the functional groups (i.e., cross-linking points) contained in the molecular structure, liquid rubber with functional groups is often divided into two categories: one type is called telechelic liquid rubber with functional groups at both ends of the molecular structure; the other type is called non-telechelic liquid rubber, in which the active functional groups are randomly distributed in the main chain within the molecular structure. Of course, there are also those with both intermediate functional groups and terminal functional groups. The current research focus is on telechelic liquid rubber. For liquid rubber, chain extenders or cross-linking agents with appropriate functional groups should be selected based on the reactive functional groups they contain.

LSR has excellent transparency, tear strength, resilience, yellowing resistance, thermal stability, water resistance, good air permeability, heat aging resistance, and weather resistance. It also has moderate viscosity and ease in operation. With high transparency of the product, it can be seen whether there are defects such as bubbles in the casting material in the mold. The linear shrinkage ratio is smaller than or equal to 0.1%. Products can be reproduced with high precision.

LSR can be used for trademarks, products, pacifiers, medical supplies, coating, dipping and perfusion, etc. It is used in molds for crystal glue, polyurethane, epoxy resin, etc., injection molding processes, cake molds and other silicone products. It is widely used in the electronics industry for moisture-proof, shipping, insulating coating, and potting of electronic components, protecting electronic components and assemblies from dust, moisture, and vibration and providing electrical insulation. If transparent gel is used to encapsulate electronic components, it not only provides shockproof and waterproof protection, but also allows the components to be seen and probes can be used to detect component failures and replace them. The damaged silicone gel can be repaired and encapsulated again. It can also be used to make product molding molds for materials such as gypsum, wax, epoxy resin, polyester resin, polyurethane resin, and low-melting point alloys. It can be used for high-frequency embossing of artificial leather, upper and sole modeling of shoes, manufacturing of arts and crafts, ceramics, toy industry, furniture, household appliances and electronic components industry reproduction, as well as the molding of plaster and cement materials, the molding of wax products, the manufacturing of models, and the molding of materials, etc. Therefore, LSR can be used in the light-guiding element 20 according to the present embodiment.

According to the present embodiment, the light-incidence microstructure 23 is disposed on the first light-incidence plane 222 of the first body 22. According to an embodiment, the light-incidence microstructure 23 is projective from the first light-incidence plane 222 of the first body 22. According to another embodiment, the light-incidence microstructure 23 is recessed in the first light-incidence plane 222 of the first body 22 and making the first light-incidence plane 222 outmost.

Please refer to FIG. 1A and FIG. 1C again. As shown in the figures, according to the present embodiment, the bottom of the first body 22 of the light-guiding element 20 is flat to form a first flat reflective plane 223. The bottom of the second body 24 of the light-guiding element 20 is flat as well to form a second flat reflective plane 243. In addition, the first flat reflective plane 223 is connected to the second flat reflective plane 243 to form the same plane. The first flat reflective plane 223 and the second flat reflective plane 243 are used to reflect the light from the light-emitting device 10.

According to the present embodiment, the top of the first body 22 of the light-guiding element 20 slopes upward from the first light-incidence plane 222 to the first light-emergence plane 224 to form a first top oblique plane 228; the top of the second body 24 of the light-guiding element 20 slopes upward from the second light-incidence plane 242 to the second light-emergence plane 244 to form a second top oblique plane 249. The second top oblique plane 249 is connected to the first top oblique plane 228 to form the same oblique plane. The first top oblique plane 228 and the second top oblique plane 249 are used for reflecting the light from the light-emitting device 10.

Figure 2A:
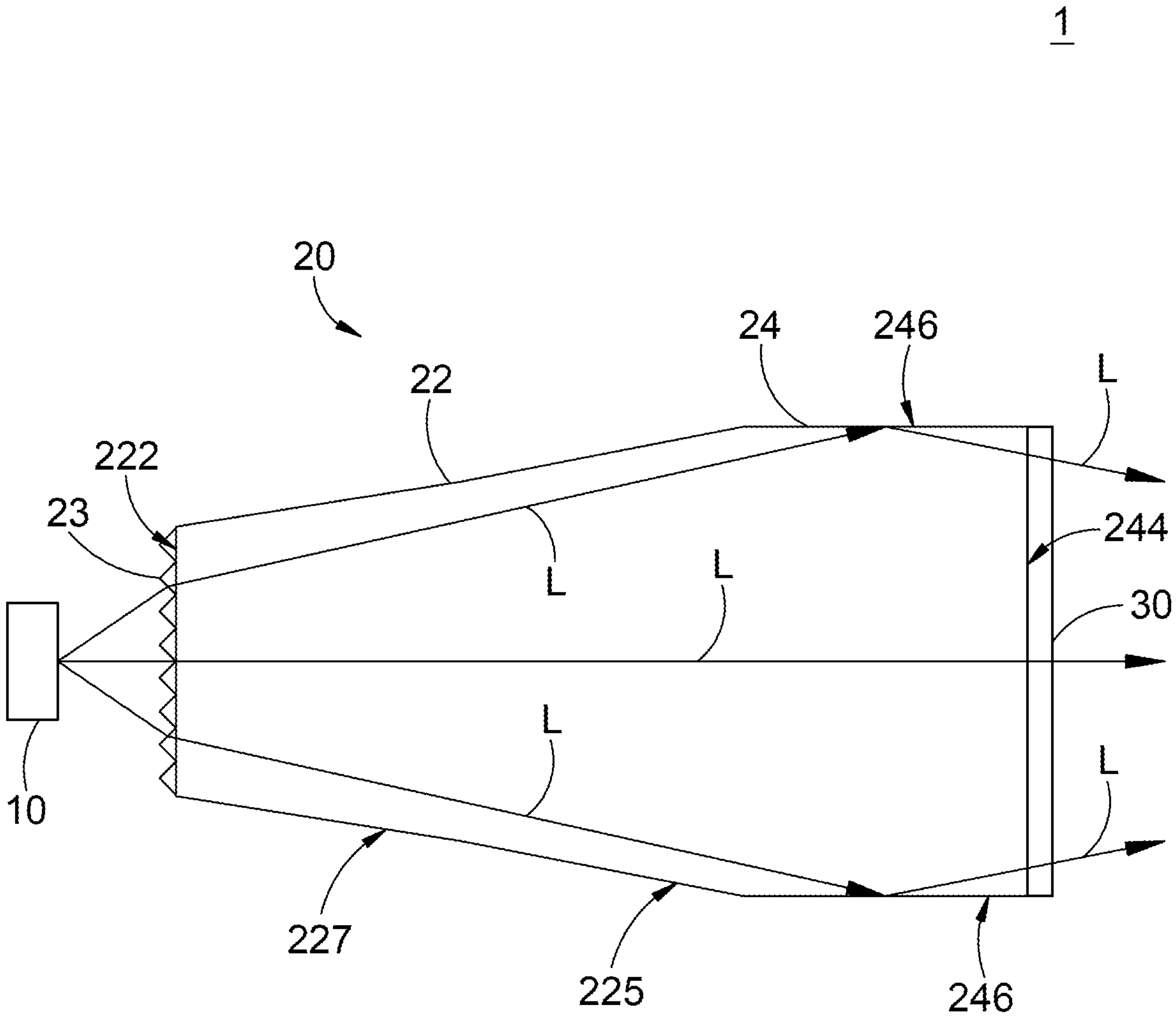
FIG. 2A to FIG. 2B show schematic diagrams of the microstructure and the light path according to an embodiment of the present invention.
Figure 2B:
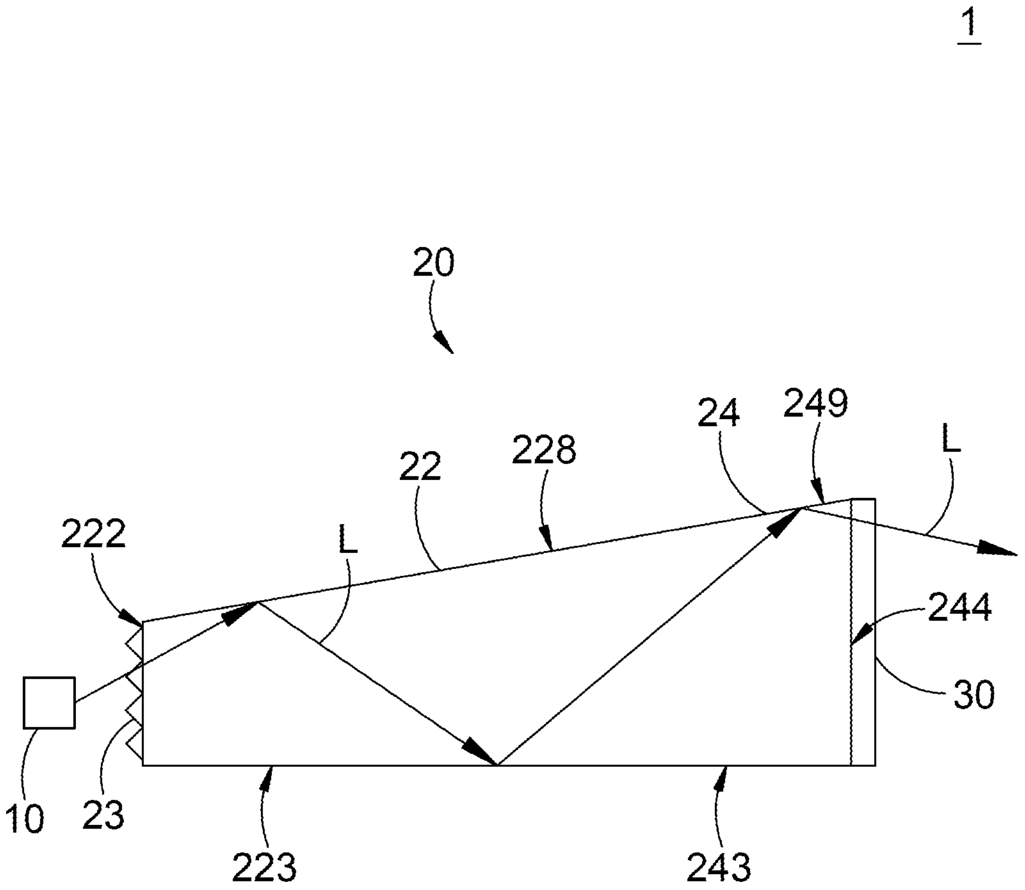

Please refer to FIG. 2A to FIG. 2B, which show schematic diagrams of the microstructure and the light path according to an embodiment of the present invention. As shown in the figures, according to the present embodiment, the structure of car lamp further comprises a light-incidence microstructure 23 and a light-emergence microstructure 30. The light-incidence microstructure 23 is disposed on the first light-incidence plane 222. The light-emergence microstructure 30 is disposed on the second light-emergence plane 244 of the second body 24 for adjusting/filtering the light emitted from the light-guiding element 20. According to an embodiment, the light-incidence microstructure 23 and light-emergence microstructure 30 can be formed integrally with the first body 22 and the second body 24. Alternatively, they can be attached to the first body 22 and the second body 24 using microstructure films. The present invention is not limited to the embodiment. The light-emitting device 10 emits light L. The light L is first emitted to the first body 22 of the light-guiding element 20. Part of the light L enters the first body 22 via the light-incidence microstructure 23 disposed on the first light-incidence plane 222. After passing through the first light-emergence plane 224 of the first body 22, the light L enters the second body 24 via the second light-incidence plane 242 of the second body 24. After passing through the second light-emergence plane 244 of the second body 24, the light L enters the light-emergency microstructure 30. Finally, the light L is emitted from the light-emergence microstructure 30 to the target region.

According to the present embodiment, the other part of the light L enters the first body 22 via the light-incidence microstructure 23 disposed on the first light-incidence plane 222. After passing through the first light-emergence plane 224 of the first body 22, the light L enters the second body 24 via the second light-incidence plane 242 of the second body 24. Owing to the oblique incidence angle, the light L is emitted to the third side oblique plane 246 of the second body 24. The third side oblique plane 246 reflects the light L to the second light-emergence plane 244. After passing through the second light-emergence plane 244, the light L enters the light-emergence microstructure 30. Finally, the light L is emitted from the light-emergence microstructure 30 to the target region. The oblique angle of the third side oblique plane 246 is used to reflect the light L back to the path and thus achieving the efficacy of controlling the shape of light.

According to the present embodiment, the other part of the light L enters the first body 22 via the light-incidence microstructure 23 disposed on the first light-incidence plane 222. Owing to the oblique incidence angle, the light L is emitted to the first side oblique plane 225 or the second side oblique plane 227 of the first body 22. The first side oblique plane 225 or the second side oblique plane 227 reflects the light L to the second light-emergence plane 244. The oblique angle of the first side oblique plane 225 and the second side oblique plane 227 is used to reflect the light L back to the path and thus achieving the efficacy of controlling the shape of light.

In the embodiment with the first flat reflective plane 223 and the first top oblique plane 228, the other part of the light L enters the first body 22 via the light-incidence microstructure 23 disposed on the first light-incidence plane 222. Owing to the oblique incidence angle, the light L is emitted to the first top oblique plane 228 of the first body 22. The first top oblique plane 228 reflects the light L to the first flat reflective plane 223. The first flat reflective plane 223 reflects the light L to the second light-incidence plane 242 of the second body 24. The subsequent path is identical to the above embodiment. Hence, the details will not be described again. The oblique angle of the first flat reflective plane 223 and the first top oblique plane 228 is used to reflect the light L back to the path and thus achieving the efficacy of controlling the shape of light.

In the embodiment with the second flat reflective plane 243 and the second top oblique plane 249, the light L enters the second body 24 via the second light-incidence plane 242 of the second body 24. Owing to the oblique incidence angle, the light L is emitted to the second flat reflective plane 243 or the second top oblique plane 249 of the second body 24. The second flat reflective plane 243 or the second top oblique plane 249 reflects the light L to the second light-emergence plane 244. After being emitted from the second light-emergence plane 244, the light L enters the light-emergence microstructure 30. Finally, the light L is emitted from the light-emergence microstructure 30 to the target region. The oblique angle of the second flat reflective plane 243 and the second top oblique plane 249 is used to reflect the light L back to the path and thus achieving the efficacy of controlling the shape of light.

The first side oblique plane 225, the second side oblique plane 227, the third side oblique plane 246, the first flat reflective plane 223, the first top oblique plane 228, the second flat reflective plane 243, and the second top oblique plane 249 all use total reflection or reflective coating layers to reflect the light L. Nonetheless, the present invention is not limited to the embodiments.

According to an embodiment, the light-incidence microstructure 23 forms V-shape structures correspondingly (as shown in FIG. 2A and FIG. 2B).

According to an embodiment, The light-emergence microstructure 30 blocks a part of the second light-emergence plane 244. According to an embodiment, the light-emergence microstructure 30 is disposed at the center of the second light-emergence plane 244. According to an embodiment, the light-emergence microstructure 30 is disposed on both sides of the second light-emergence plane 244 for adjusting the shape of emergent light correspondingly.

According to an embodiment, the light-incidence microstructure 23 and the light-emergence microstructure 30 can be manufactured using the embossing process, which is a hot embossing molding method that forms micro-nano structure patterns on polymer substrate materials. It is mainly used in the manufacture of various polymer microstructures. It uses a flattening and thickness-adjusting device to flatten the extruded polymer substrate, a temperature control device to ensure the temperature of the surface of the polymer substrate to be imprinted, and an imprinting device equipped with an imprinting microstructure. The stamping mold realizes the transfer of microstructure by applying pressure. The pressure control device is used to adjust the pressure exerted on the polymer substrate. Finally, the pressure holding cooling device is used to achieve cooling and shaping of the microstructure. Nonetheless, the present invention is not limited to the embodiment.

Figure 3:
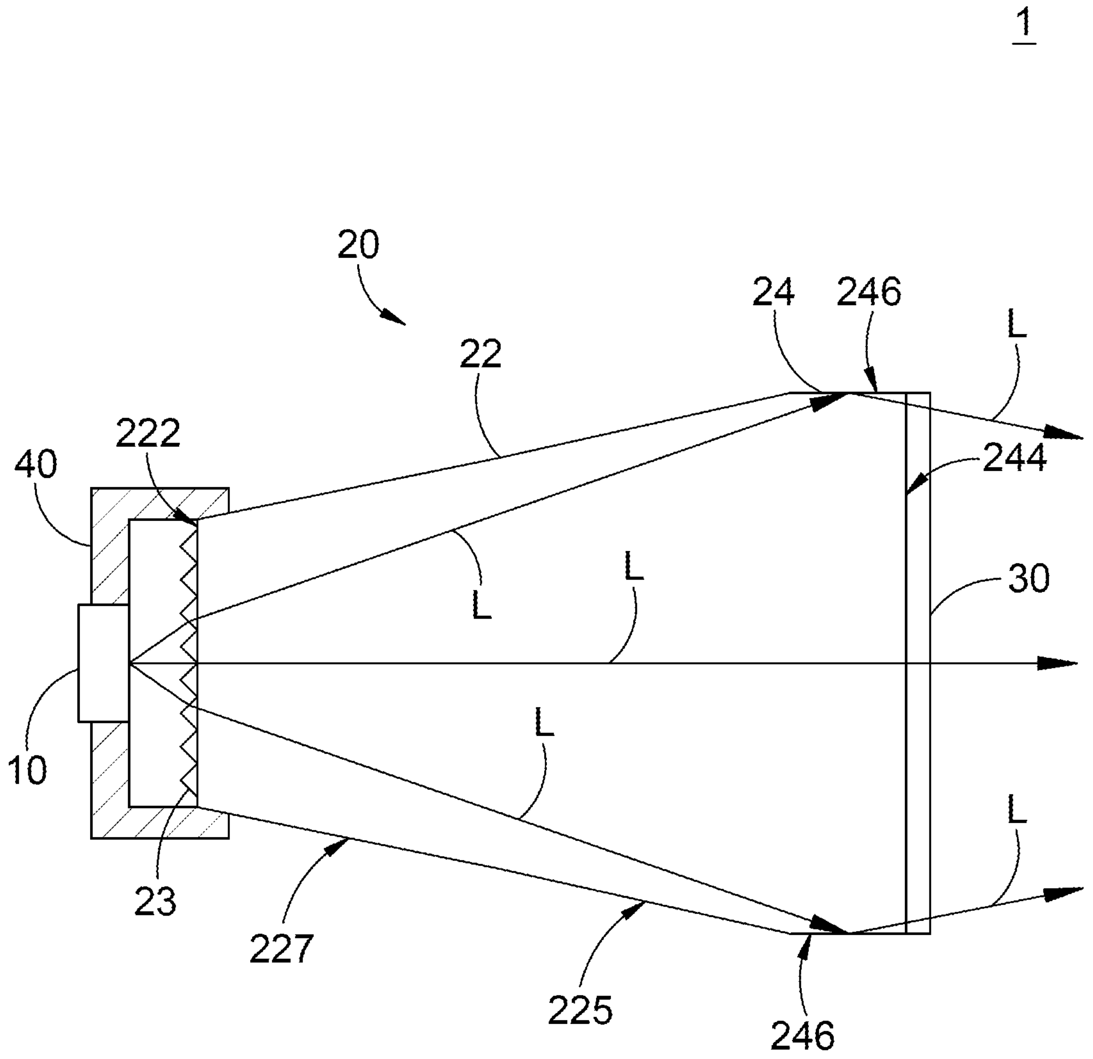
FIG. 3 shows a structural schematic diagram of the clamping member according to an embodiment of the present invention.

Please refer to FIG. 3, which shows a structural schematic diagram of the clamping member according to an embodiment of the present invention. As shown in the figure, the present embodiment is based on the first embodiment described above. The structure of car lamp according to the present embodiment further comprises a clamping member 40 disposed between the light-emitting device 10 and the light-guiding element 20. The light-emitting device 10 disposed on one end of the clamping member 40. The first body 22 of the light-guiding element 20 is disposed on the other end of the clamping member 40. In other words, the clamping member 40 clamps the light-emitting device 10 and the light-guiding element 20 for holding the light-emitting device 10 from arbitrary movement. The clamping member 40 according to the present embodiment can be applied to other embodiments.

Figure 4:
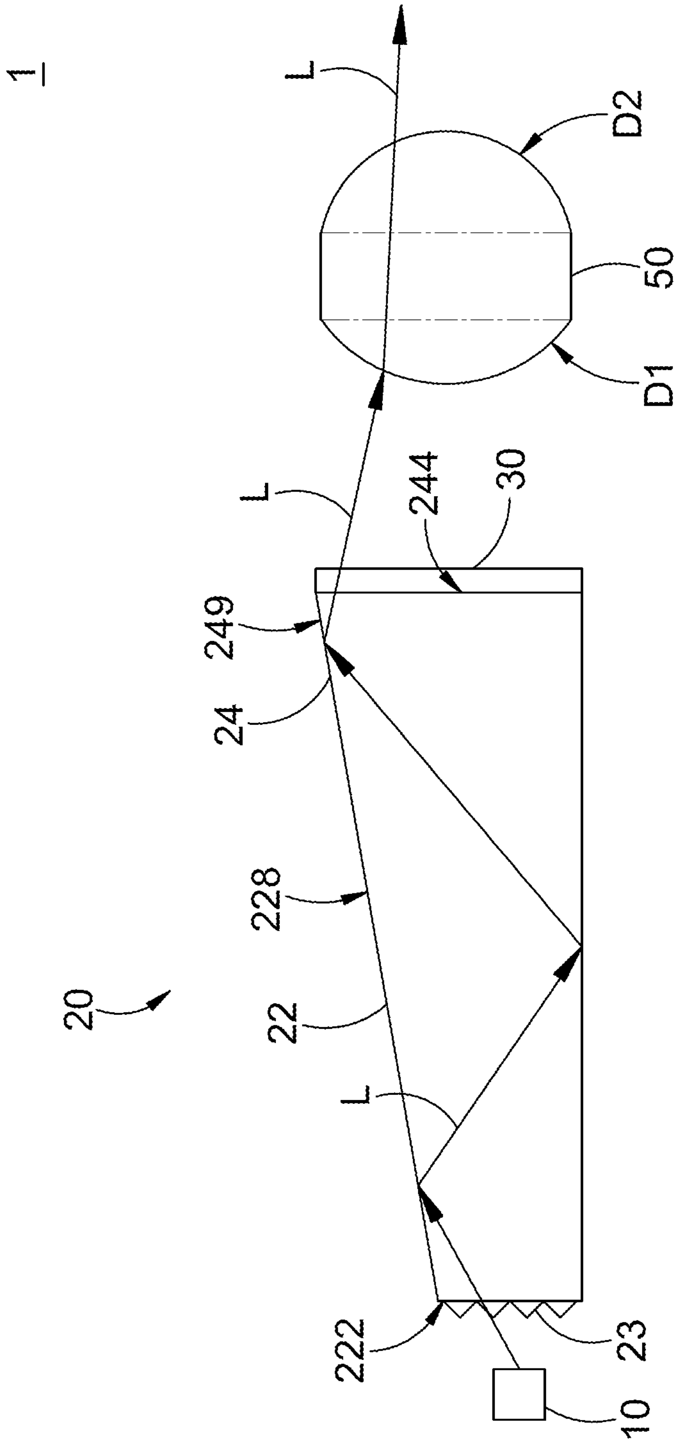
FIG. 4 shows a structural schematic diagram of the optical lens according to an embodiment of the present invention.

Please refer to FIG. 4, which shows a structural schematic diagram of the optical lens according to an embodiment of the present invention. As shown in the figure, the present embodiment is based on the first embodiment described above. The structure of car lamp according to the present embodiment further comprises an optical lens 50 disposed on one side of the light-emergence microstructure 30. The optical lens 50 receives the light L emitted from the light-emergence microstructure 30. Then the light L passes through the optical lens 50 to the target region.

Please refer to FIG. 4 again. As shown in the figure, the present embodiment is based on the first embodiment described above. According to the present embodiment, the optical lens 50 is a double convex lens. It includes a first convex surface D1 on one side and a second convex surface D2 on the other. The first convex surface D1 of the optical lens 50 receives the light L emitted from the light-emergence microstructure 30. According to an embodiment, the radius of the first convex surface D1 is greater than the radius of the second convex surface D2. By using the double-convex optical lens 50, the shape of the emergent light L can be adjusted.

Figure 5A:
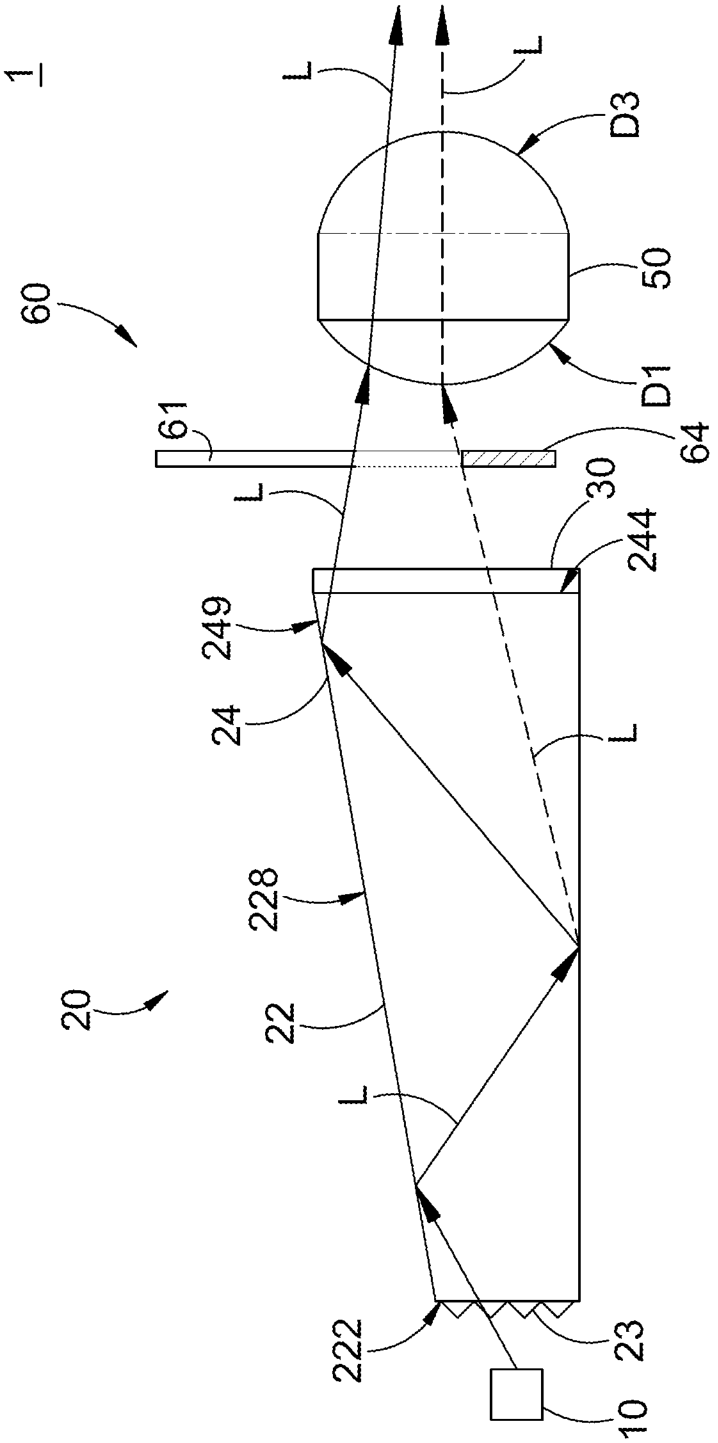
FIG. 5A shows a structural schematic diagram of the shielding member and the convex optical lens according to an embodiment of the present invention.

Please refer to FIG. 5A, which shows a structural schematic diagram of the shielding member and the convex optical lens according to an embodiment of the present invention. As shown in the figure, the present embodiment is based on the above embodiment of double-convex optical lens 50 described above. The structure of car lamp according to the present embodiment further comprises a shielding assembly 60 disposed between the light-emergence microstructure 30 and the optical lens 50. The shielding assembly 60 corresponds to the first convex surface D1 and the second convex surface D2 of the optical lens 50 described above for adjusting the shape of the emergent light L. According to the present embodiment, the shielding assembly 60 includes a hole 61 and a bottom shielding member 64. The light L passes through the hole 61 located on the top of the bottom shielding member 64. The bottom shielding member 64 is used for further adjusting the shape of the emergent light L, so that the light L can controlled within a certain range when the light L is emitted to the target region.

Figure 5B:
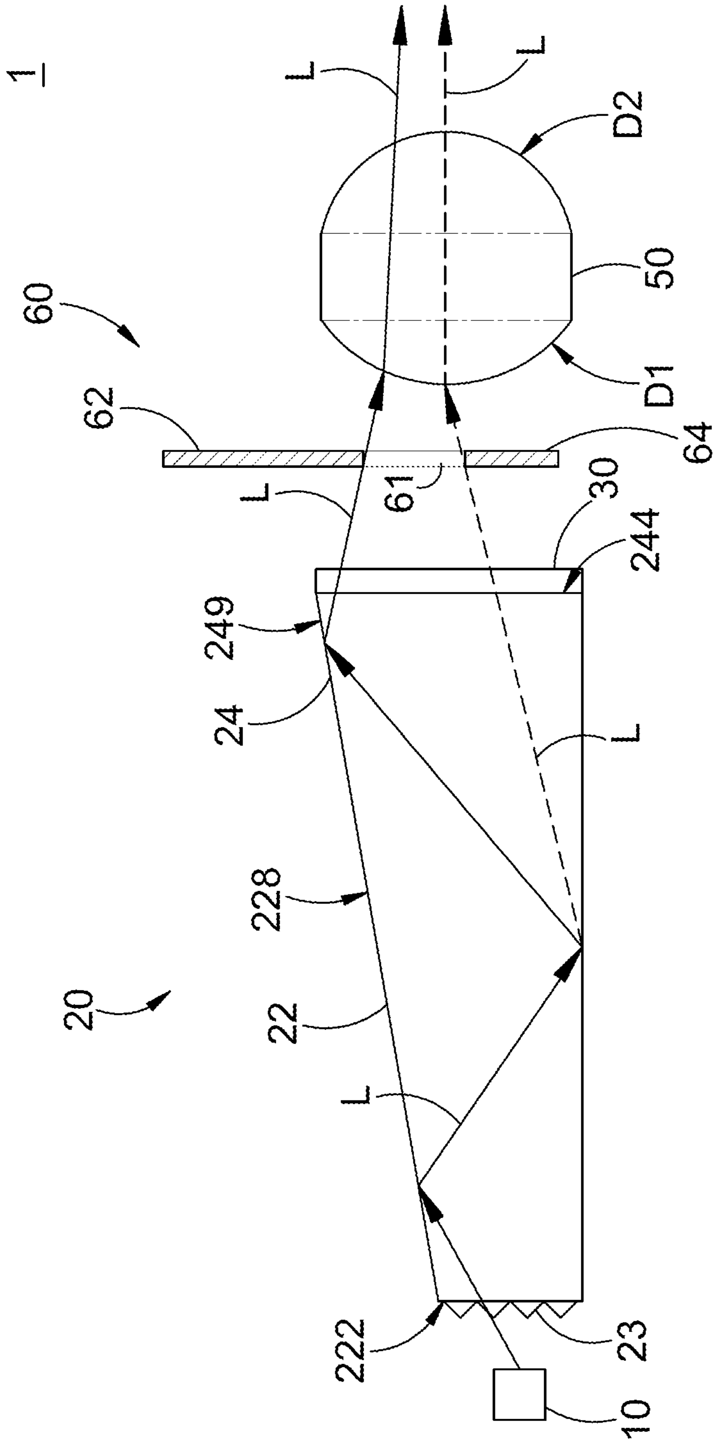
FIG. 5B shows a structural schematic diagram of the shielding member and the convex optical lens according to another embodiment of the present invention.

Please refer to FIG. 5B, which shows a structural schematic diagram of the shielding member and the convex optical lens according to another embodiment of the present invention. As shown in the figure, the shielding assembly 60 further includes a top shielding member 62 disposed on the top of the hole 61. The light L passes through the hole 61. In other words, the light L will pass through the gap between the top shielding member 62 and the bottom shielding member 64. According to the present embodiment, the hole 61 can further adjust the shape of the emergent light L, so that the light L can controlled within a certain range when the light L is emitted to the target region.

Figure 6:
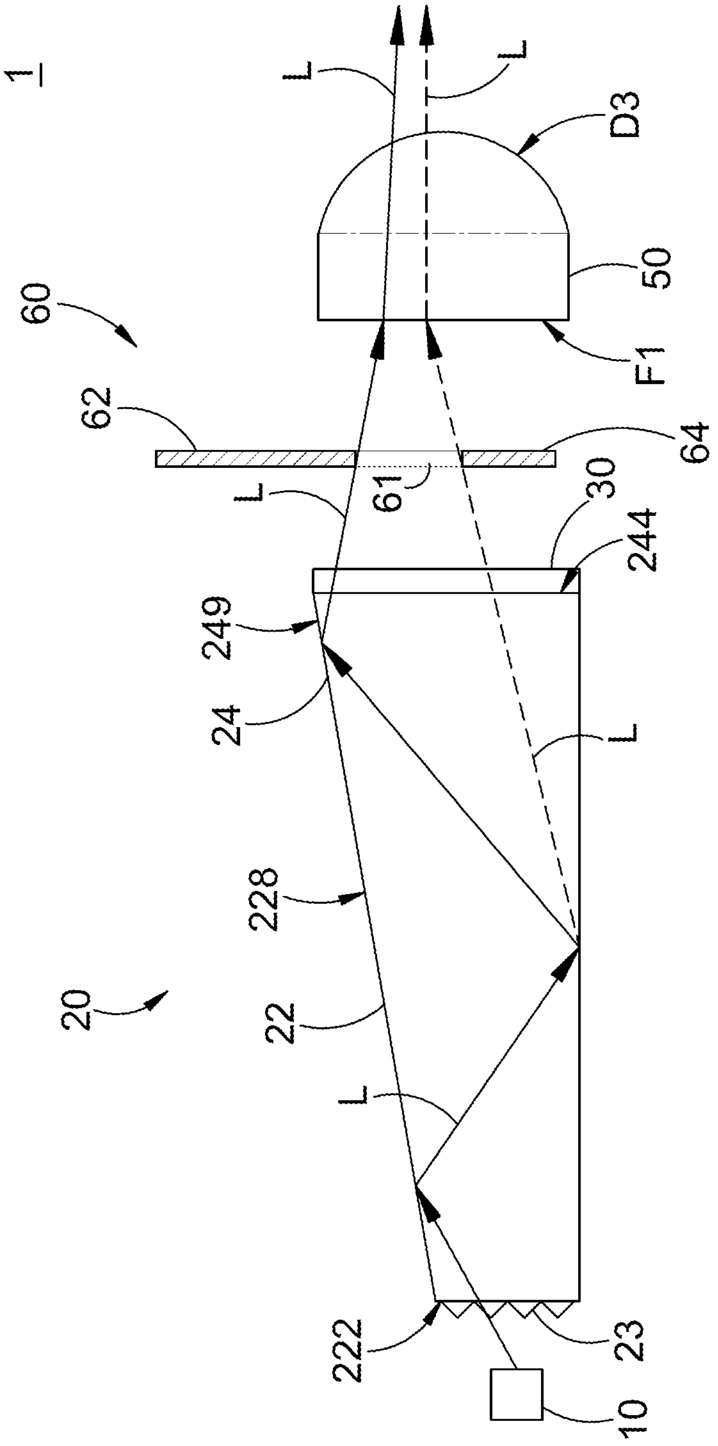
FIG. 6 shows a structural schematic diagram of the shielding member and the planar optical lens according to an embodiment of the present invention.

Please refer to FIG. 6, which shows a structural schematic diagram of the shielding member and the planar optical lens according to an embodiment of the present invention. As shown in the figure, the present embodiment is based on the above embodiment, The optical lens 50 is a plano-convex lens. It includes a first flat surface F1 on one side and a third convex surface D3 on the other. The first flat surface F1 of the optical lens receives the light emitted from the light-emergence microstructure 30. By using the plano-convex optical lens 50, the shape of the emergent light L can be adjusted.

According to the present embodiment, the shielding assembly 60 is disposed between the light-emergence microstructure 30 and the optical lens 50. It corresponds to the first flat surface F1 and the third convex surface D3 of the optical lens 50. By using the hole 61, the top shielding member 62, and the bottom shielding member 64 of the shielding assembly 60, the shape of the emergent light L can be further adjusted.

According to an embodiment, the shielding assembly 60 can further make the cut-off line of light and dark more obvious, which reduces the scattering of light to non-target regions, such as directly shining into the eyes of pedestrians and oncoming cars.

According to an embodiment, the shielding assembly 60 can further compensates the assembly tolerance for the light-emitting device 10, the light-guiding element 20, and the optical lens 50.

Figure 7A:
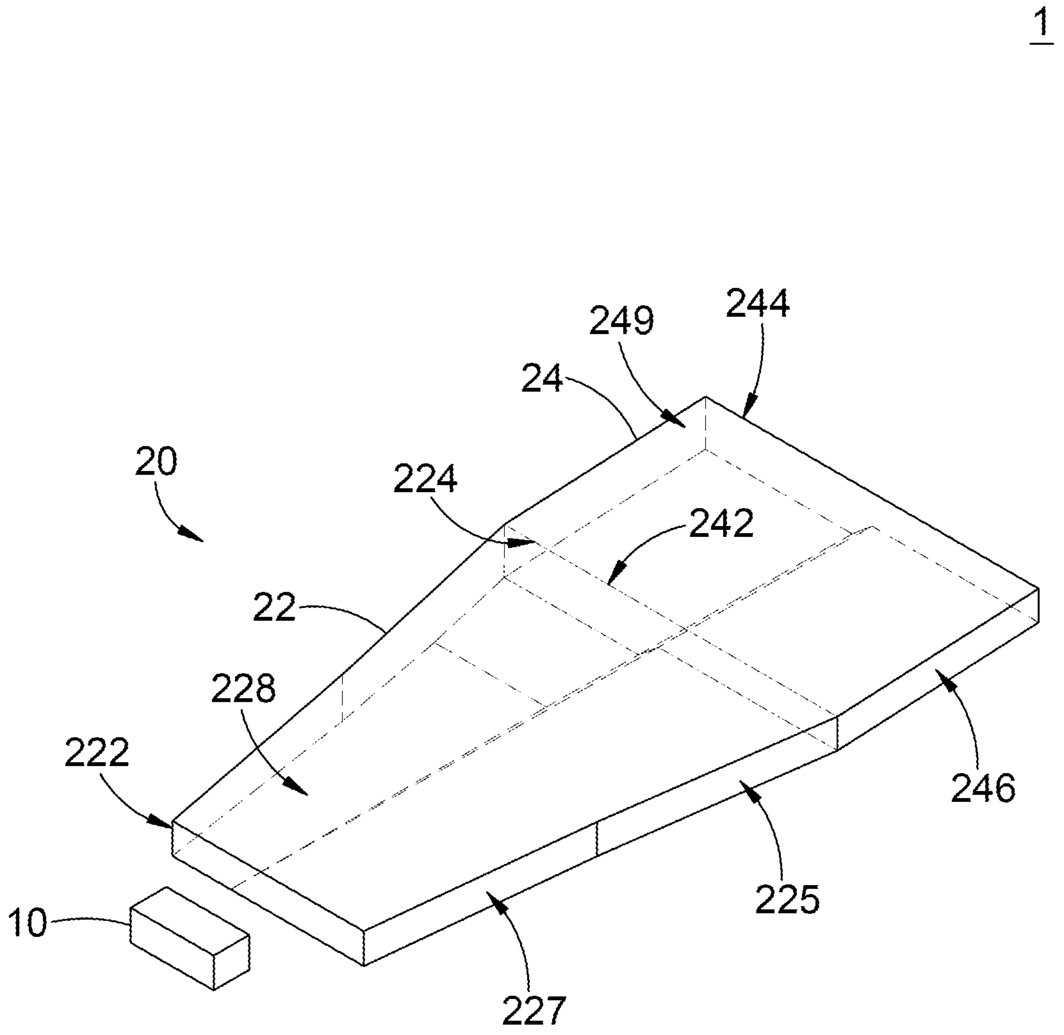
FIG. 7A shows a stereoscopic structural view according to another embodiment of the present invention.
Figure 7B:
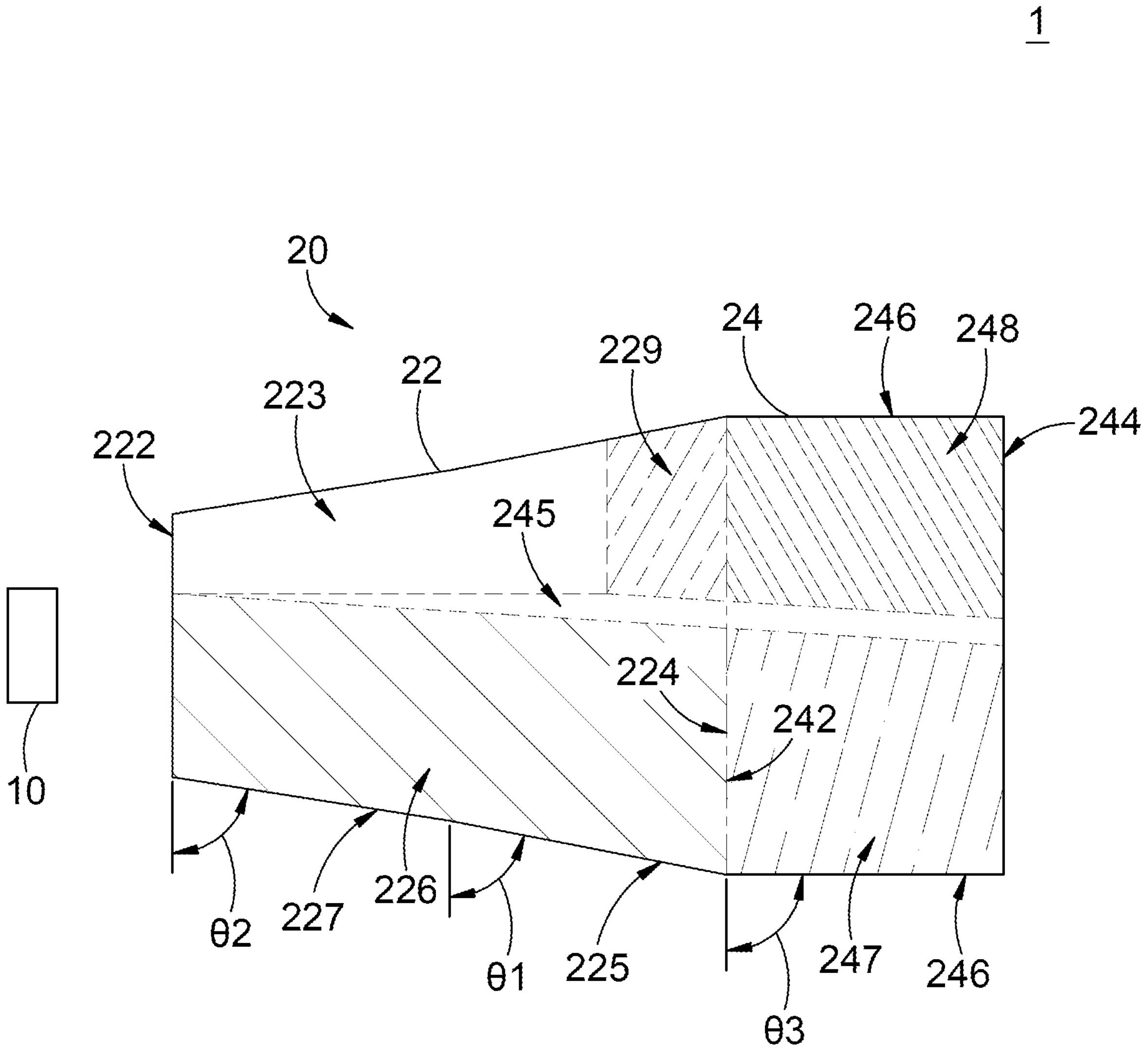
FIG. 7B shows a top view according to another embodiment of the present invention.
Figure 7C:
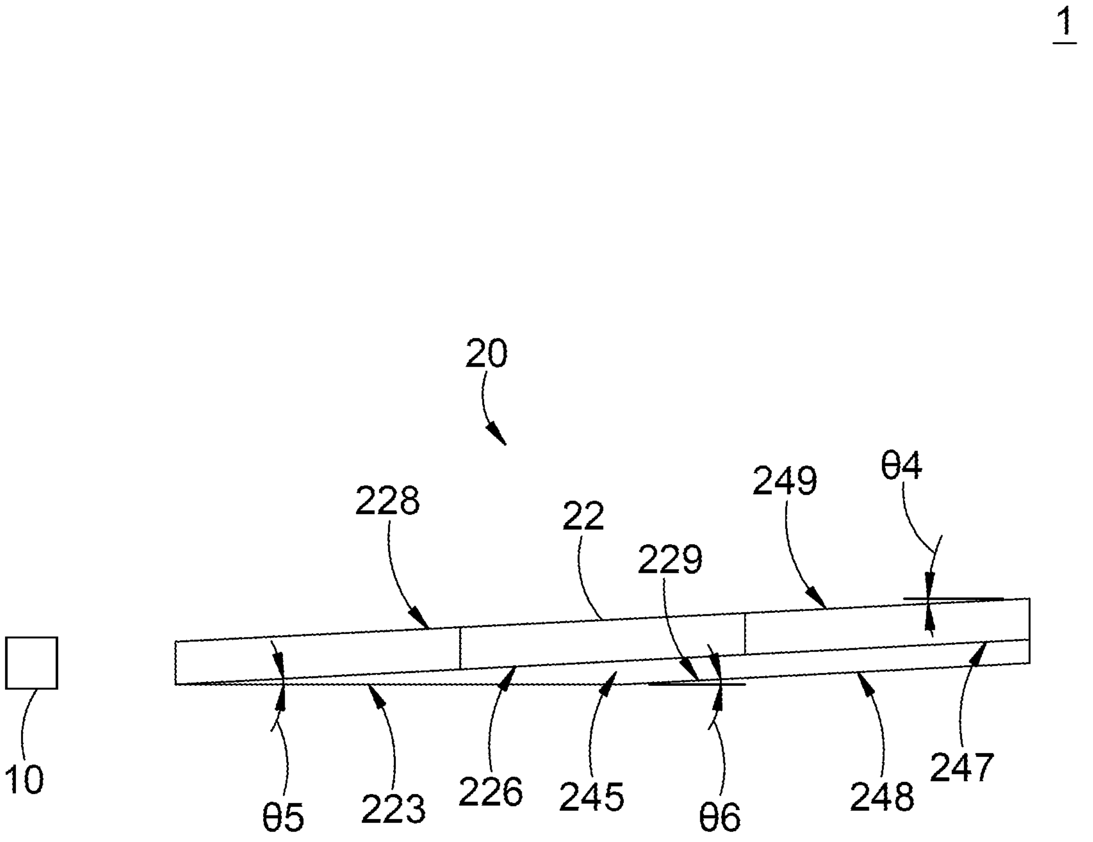
FIG. 7C shows a side view according to another embodiment of the present invention.

Please refer to FIG. 7A, FIG. 7B, and FIG. 7C. FIG. 7A shows a stereoscopic structural view according to another embodiment of the present invention; FIG. 7B shows a top view according to another embodiment of the present invention; FIG. 7C shows a side view according to another embodiment of the present invention. As shown in the figures, the present embodiment is based on the first embodiment described above. According to the present embodiment, the bottom of the first body 22 of the light-guiding element 20 slopes downward from the first light-emergence plane 224 to the first light-incidence plane 222 to form a first bottom oblique plane 226. The bottom of the first body 22 slopes downward from the first light-emergence plane 224 to the first side oblique plane 225 to form a second bottom oblique plane 229. The first bottom oblique plane 226 is disposed on one side of the second bottom oblique plane 229.

According to the present embodiment, the bottom of the second body 24 of the light-guiding element 20 slopes downward from the second light-emergence plane 244 to the second light-incidence plane 242 to form a third bottom oblique plane 248. The bottom of the second body 24 slopes downward from the second light-emergence plane 244 to the second light-incidence plane 242 to form a fourth bottom oblique plane 247. The third bottom oblique plane 248 is connected to the second bottom oblique plane 229. The fourth bottom oblique plane 247 is connected to the first bottom oblique plane 226. According to the present embodiment, the first bottom oblique plane 226, the second bottom oblique plane 229, the third bottom oblique plane 248, and the fourth bottom oblique plane 247 can adjust the angle of the light incident to the first body 22 and the second body 24. The relation among the other components according to the present embodiment is identical that according to the first embodiment described above. Hence, the details will not be repeated.

According to the present embodiment, a fifth angle θ5 of the first bottom oblique plane 226 and the fourth bottom oblique plane 247 is between 0° and 5°. A sixth angle θ6 of the second bottom oblique plane 229 and the third bottom oblique plane 248 is between 0° and 5°. The fifth angle θ5 is smaller than or equal to the sixth angle θ6.

Figure 7D:
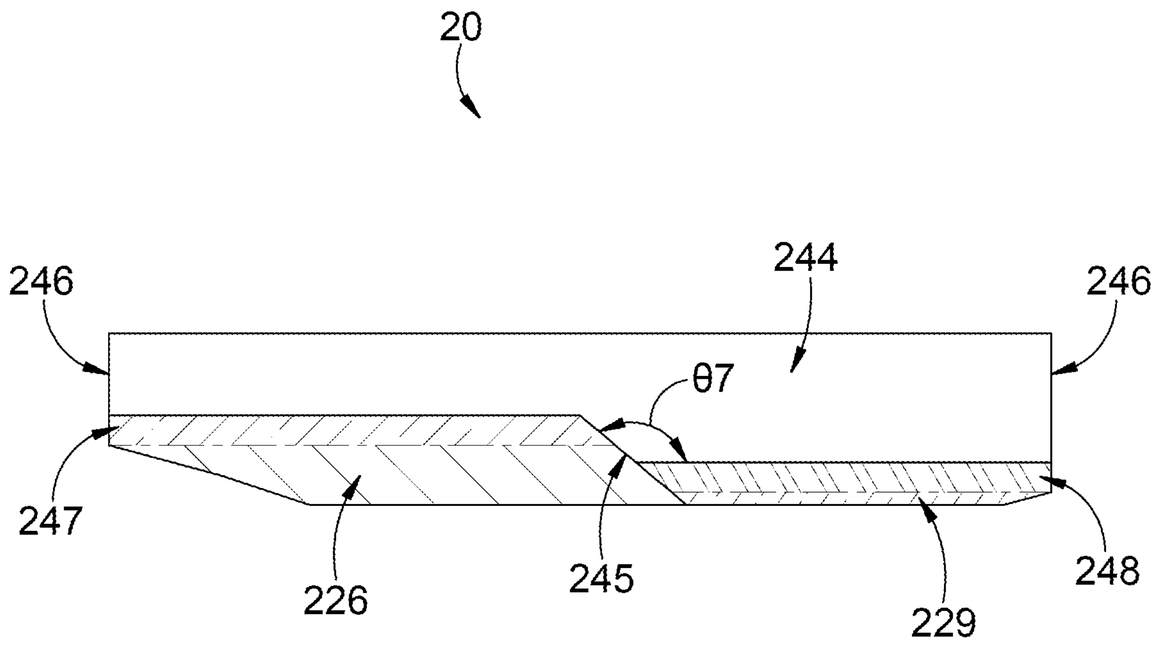
FIG. 7D shows a front view according to another embodiment of the present invention.

Please refer again to FIG. 7A, FIG. 7B, and FIG. 7C and to FIG. 7D, which shows a front view according to another embodiment of the present invention. A connecting plane 245 is disposed among the first bottom oblique plane 226, the second bottom oblique plane 229, the third oblique plane 248, and the fourth bottom oblique plane 247 for connecting the planes. A seventh angle θ7 of the connecting plane 245 is between 130° and 150° for avoiding decreased luminous efficacy caused by excessively large or small angle of the connecting plane 245.

According to the present embodiment, the bottom of the first body 22 outside the first bottom oblique plane 226 and the second bottom oblique plane 229 is flat to form a first flat reflective plane 223 for reflecting the light. The first flat reflective plane 223 is connected to the first bottom oblique plane 226, the second bottom oblique plane 229, and the connecting plane 245.

Figure 8A:
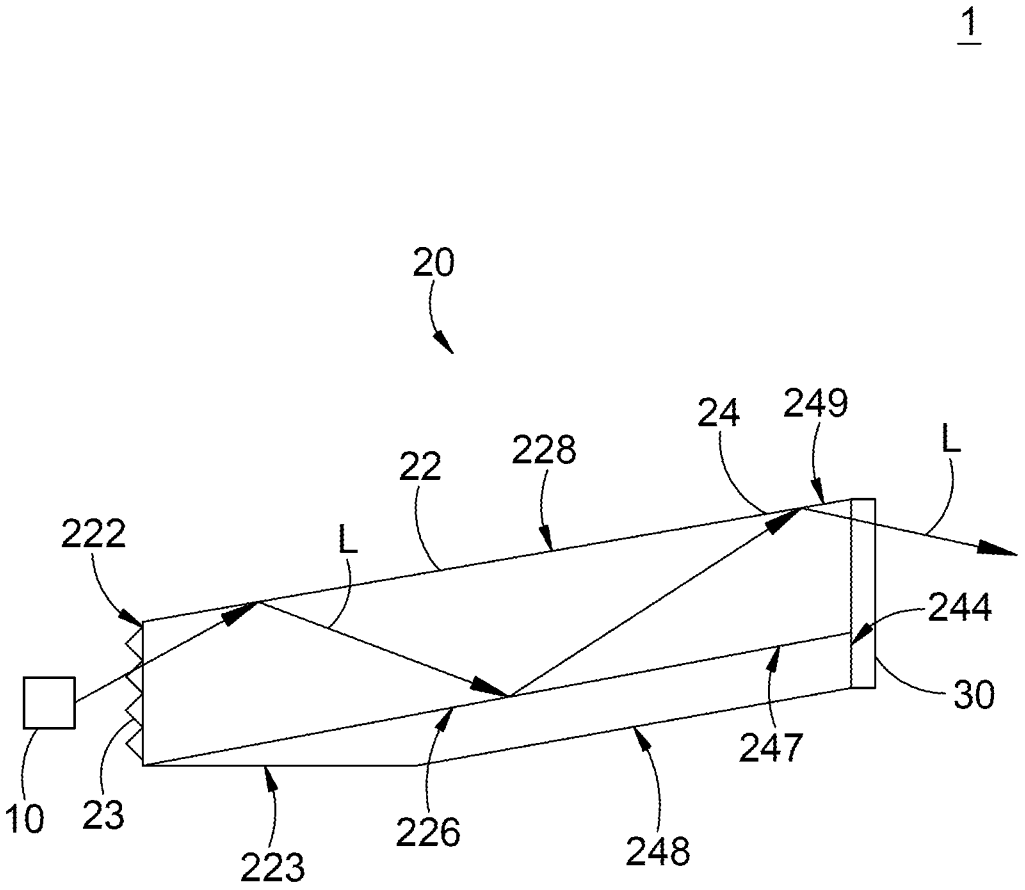
FIG. 8A to FIG. 8B show schematic diagrams of the microstructure and the light path according to another embodiment of the present invention.
Figure 8B:
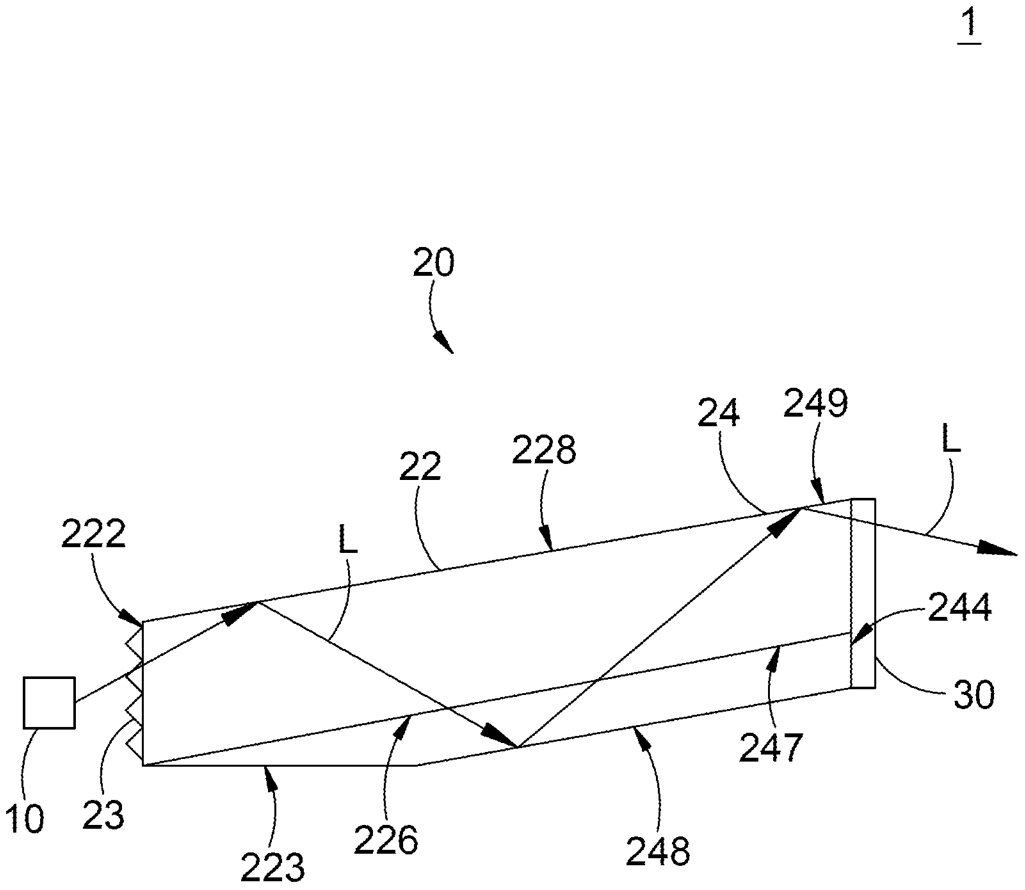

Please refer to FIG. 8A to FIG. 8B, which show schematic diagrams of the microstructure and the light path according to another embodiment of the present invention. To make the optical path concrete, the light-guiding elements 20 in FIG. 8A to FIG. 8B are scaled. As shown in the figures, according to the present embodiment, the light-emitting device 10 emits light L. Part of the light L is incident to the first body 22 via the light-incidence microstructure 23 disposed on the first light-incidence plane 222 of the first body 22. Owing to the oblique incidence angle, the light L is emitted to the first top oblique plane 228 of the first body 22. The first top oblique plane 228 reflects the light L to the first bottom oblique plane 226 or the fourth bottom oblique plane 247. The first bottom oblique plane 226 or the fourth bottom oblique plane 247 reflects the light L to the second top oblique plane 249 or to the second body 24 directly. The light L is incident to the light-emergence microstructure 30. Finally, the light L is emitted from the light-emergence microstructure 30 to the target region. The oblique angle of the first bottom oblique plane 226, the fourth bottom oblique plane 247, the first top oblique plane 228, and the second top oblique plane 249 is used to reflect the light L back to the path and thus achieving the efficacy of controlling the shape of light.

According to the present embodiment, the other part of the light L is incident to the first body 22 via the light-incidence microstructure 23 disposed on the first light-incidence plane 222 of the first body 22. Owing to the oblique incidence angle, the light L is emitted to the first top oblique plane 228 of the first body 22. The first top oblique plane 228 reflects the light L to the second bottom oblique plane 229 or the third bottom oblique plane 248. The second bottom oblique plane 229 or the third bottom oblique plane 248 reflects the light L to the second top oblique plane 249 or to the second body 24 directly. The light L is incident to the light-emergence microstructure 30. Finally, the light L is emitted from the light-emergence microstructure 30 to the target region. The oblique angle of the second bottom oblique plane 229, the third bottom oblique plane 248, the first top oblique plane 228, and the second top oblique plane 249 is used to reflect the light L back to the path and thus achieving the efficacy of controlling the shape of light. The path of the other part of the light L according to the present embodiment is identical the that according to the first embodiment described above. Hence, the details will not be repeated.

The first side oblique plane 225, the second side oblique plane 227, the third side oblique plane 246, the first flat reflective plane 223, the first top oblique plane 228, the second flat reflective plane 243, and the second top oblique plane 249 all use total reflection or reflective coating layers to reflect the light L. Nonetheless, the present invention is not limited to the embodiments.

Figure 9:
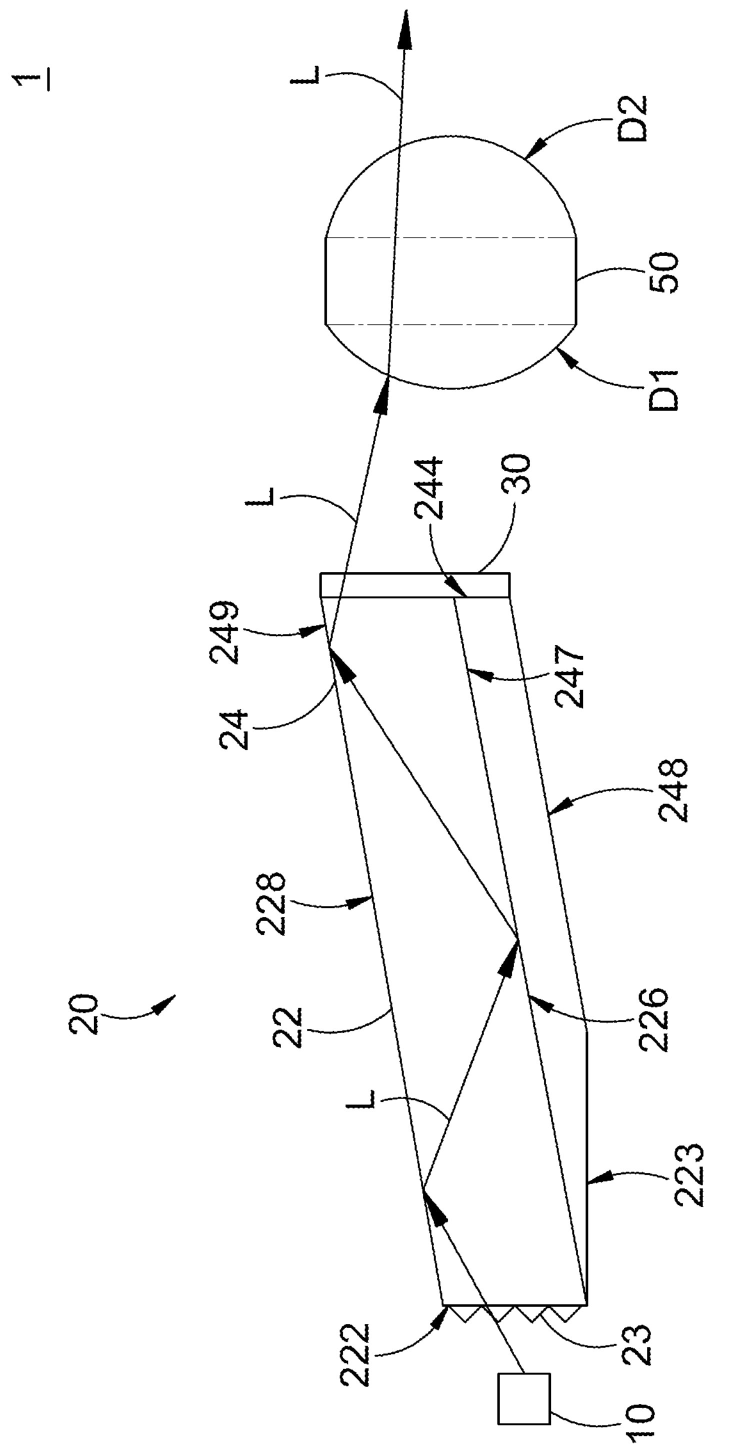
FIG. 9 shows a structural schematic diagram of the optical lens according to another embodiment of the present invention.

Please refer to FIG. 9, which shows a structural schematic diagram of the optical lens according to another embodiment of the present invention. As shown in the figure, the present embodiment is based on the embodiment with the first bottom oblique plane 226, the second bottom oblique plane 229, the third bottom oblique plane 248, and the fourth bottom oblique plane 247 described above. The structure of car lamp according to the present embodiment can comprise an optical lens 50 and the clamping member 40. The relation among the other components according to the present embodiment is identical that according to the first embodiment described above. Hence, the details will not be repeated.

To sum up, the present invention provides a structure of car lamp. A third side oblique plane is disposed on the side surface of a light-guiding element. By using the third side oblique plane and reflective planes to reflect part of incident light to the light-emergence planes, the reduction of the overall luminous efficacy of the structure of car lamp can be avoided. Furthermore, by disposed microstructures on the light-emergence plane and the light-incidence plane of the light-guiding element for adjusting the shape of the incident and emergent light, the range of changing the shape of light according to the prior art is limited. Thereby, a shielding member is disposed to directly block part of the emergent light for adjusting the shape of the emergent light. However, it also reduces the luminous efficacy of car lamps; it requires more power to meet the brightness requirements. Accordingly, the industry needs a structure of car lamp that can effectively adjust the shape of emergent light.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A structure of car lamp, comprising:

a light-emitting device; and a light-guiding element, including:

a first body, including a first light-incidence plane on the end corresponding to said light-emitting device and a first light-emergence plane on the other end thereof, the width of said first body shrinking gradually from said first light-emergence plane to said first light-incidence plane and forming a first side oblique plane and a second side oblique plane sequentially on both sides of said first body, said first body including a first flat reflective plane at the bottom, the top of said first body sloping upward from said first light-incidence plane to said first light-emergence plane to form a first top oblique plane; and a second body, including a second light-incidence plane on one end and a second light-emergence plane on the other end thereof, said second light-incidence plane connected to said first light-emergence plane, said second body including a third side oblique plane, respectively, on both sides between said second light-incidence plane and said second light-emergence plane, said second body including a second flat reflective plane at the bottom, the top of the second body sloping upward from said second light-incidence plane to said second light-emergence plane to form a second top oblique plane;

where a first angle between said first side oblique plane and said first light-emergence plane is smaller than a second angle between said second side oblique plane and said first light-emergence plane; a third angle between said third oblique plane and said first light-emergence plane is greater than said second angle; said first angle is between 70° and 90°; said second angle is between 70° and 90°; and said third angle is between 80° and 95°; said first top oblique plane is connected to said second top oblique plane; a fourth angle between said first top oblique plane and the normal of said second light-emergence plane and between said second top oblique plane and the normal of said second light-emergence plane is between 0° and 5°;

where said light-emitting device emits light to said light-guiding element; part of said light passes through said first body and said second body of said light-guiding element sequentially; then said light passes through said second light-emergence plane for emitting outward; after the other part of said light is emitted to said third side oblique plane, said light is reflected and emitted outward from said second body.

2. The structure of car lamp of claim 1, and further comprising a light-incidence microstructure, a light-emergence microstructure, a clamping member, and an optical lens; said light-incidence microstructure disposed on said first light-incidence plane; said light-emergence microstructure disposed on said second light-emergence plane; said clamping member disposed between said light-emitting device and said light-guiding element; said light-emitting device disposed on one end of said clamping member; said first body disposed on the other end of said clamping member; and said optical lens disposed on one side of said second light-emergence plane and receiving said light from said second light-emergence plane.

3. The structure of car lamp of claim 2, wherein said light-emergence microstructure blocks a part of said second light-emergence plane.

4. The structure of car lamp of claim 2, wherein said optical lens includes a first convex surface on one side and a second convex surface on the other; said first convex surface of said optical lens receives said light emitted from said second light-emergence plane; and the radius of said first convex surface is greater than the radius of said second convex surface.

5. The structure of car lamp of claim 4, and further comprising a shielding assembly disposed between said second light-emergence plane and said optical lens; said shielding assembly including a hole and a bottom shielding member; said light passing through said hole located on the top of said bottom shielding member; said bottom shielding member used for blocking part of said scattered light; said shielding assembly further including a top shielding member disposed on the top of said hole; and said light passing through said hole.

6. The structure of car lamp of claim 2, wherein said optical lens includes a first flat surface on one side and a third convex surface on the other; and said first flat surface of said optical lens receives said light emitted from said second light-emergence plane.

7. The structure of car lamp of claim 6, and further comprising a shielding assembly disposed between said second light-emergence plane and said optical lens; said shielding assembly including a hole and a bottom shielding member; said light passing through said hole located on the top of said bottom shielding member; said bottom shielding member used for blocking part of said scattered light; said shielding assembly further including a top shielding member disposed on the top of said hole; and said light passing through said hole.

8. A structure of car lamp, comprising:

a light-emitting device; and a light-guiding element, including a first body and a second body, said first body including a first light-incidence plane one the end corresponding to said light-emitting device and a first light-emergence plane on the other end thereof, the width of said first body shrinking gradually from said first light-emergence plane to said first light-incidence plane and forming a first side oblique plane and a second side oblique plane sequentially on both sides of said first body, the bottom of said first body sloping downward from said first light-emergence plane to said first light-incidence plane to form a first bottom oblique plane, the bottom of said first body sloping downward from said first light-emergence plane to said first side oblique plane to form a second bottom oblique plane, the top of said first body sloping upward from said first light-incidence plane to said first light-emergence plane to form a first top oblique plane; and a second body, including a second light-incidence plane on one end and a second light-emergence plane on the other end thereof, said second light-incidence plane connected to said first light-emergence plane, said second body including a third side oblique plane, respectively, on both sides between said second light-incidence plane and said second light-emergence plane, the bottom of said second body sloping downward from said second light-emergence plane to said second light-incidence plane to form a third bottom oblique plane, the bottom of said second body sloping downward from said second light-emergence plane to said second light-incidence plane to form a fourth bottom oblique plane, said third bottom oblique plane connected to said second bottom oblique plane, said fourth bottom oblique plane connected to said first bottom oblique plane, the top of said second body sloping upward from said second light-incidence plane to said second light-emergence plane to form a second top oblique plane;

where a first angle between said first side oblique plane and said first light-emergence plane is smaller than a second angle between said second side oblique plane and said first light-emergence plane; a third angle between said third oblique plane and said first light-emergence plane is greater than said second angle;

where said light-emitting device emits light to said light-guiding element; part of said light passes through said first body and said second body of said light-guiding element sequentially; then said light passes through said second light-emergence plane for emitting outward; after the other part of said light is emitted to said third side oblique plane, said light is reflected and emitted outward from said second light-emergence plane.

9. The structure of car lamp of claim 8, wherein said first angle is between 70° and 90°; said second angle is between 70° and 90°; and said third angle is between 80° and 95°; said first top oblique plane is connected to said second top oblique plane; a fourth angle between said first top oblique plane and the normal of said second light-emergence plane and between said second top oblique plane and the normal of said second light-emergence plane is between 0° and 5°; a fifth angle of said first bottom oblique plane and said fourth bottom oblique plane is between 0° and 5°; a sixth angle of said second bottom oblique plane and said third bottom oblique plane is between 0° and 5°; said fifth angle is smaller than or equal to said sixth angle; a connecting plane is disposed among said first bottom oblique plane, said second bottom oblique plane, said third oblique plane, and said fourth bottom oblique plane; a seventh angle of said connecting plane is between 130° and 150°.

10. The structure of car lamp of claim 8, and further comprising a light-incidence microstructure, a light-emergence microstructure, a clamping member, and an optical lens; said light-incidence microstructure disposed on said first light-incidence plane; said light-emergence microstructure disposed on said second light-emergence plane; said clamping member disposed between said light-emitting device and said light-guiding element; said light-emitting device disposed on one end of said clamping member; said first body disposed on the other end of said clamping member; and said optical lens disposed on one side of said second light-emergence plane and receiving said light from said second light-emergence plane.

11. The structure of car lamp of claim 10, wherein said light-emergence microstructure blocks a part of said second light-emergence plane.

12. The structure of car lamp of claim 10, wherein said optical lens includes a first convex surface on one side and a second convex surface on the other; said first convex surface of said optical lens receives said light emitted from said second light-emergence plane; and the radius of said first convex surface is greater than the radius of said second convex surface.

13. The structure of car lamp of claim 12, and further comprising a shielding assembly disposed between said second light-emergence plane and said optical lens; said shielding assembly including a bottom shielding member; said light passing through the top of said bottom shielding member; said shielding assembly further including a top shielding member; said bottom shielding member disposed under said top shielding member with a gap; and said light passing through said gap between said top shielding member and said bottom shielding member.

14. The structure of car lamp of claim 10, wherein said optical lens includes a first flat surface on one side and a third convex surface on the other; and said first flat surface of said optical lens receives said light emitted from said second light-emergence plane.

15. The structure of car lamp of claim 14, and further comprising a shielding assembly disposed between said second light-emergence plane and said optical lens; said shielding assembly including a bottom shielding member; said light passing through the top of said bottom shielding member; said shielding assembly further including a top shielding member; said bottom shielding member disposed under said top shielding member with a gap; and said light passing through said gap between said top shielding member and said bottom shielding member.

* * * * *